US012435094B1

(12) United States Patent
Mitchell et al.

(10) Patent No.: US 12,435,094 B1
(45) Date of Patent: Oct. 7, 2025

(54) METHODS OF PREPARING ISOMERS, ANALOGS, AND SYNTHETIC DERIVATIVES FROM AKUAMMA SEEDS

(71) Applicants: Haywood Max Mitchell, Santa Barbara, CA (US); Cecil Page, Ojai, CA (US); Joseph William Merino, Oxnard, CA (US)

(72) Inventors: Haywood Max Mitchell, Santa Barbara, CA (US); Cecil Page, Ojai, CA (US); Joseph William Merino, Oxnard, CA (US)

( * ) Notice: Subject to any disclaimer, the term of this patent is extended or adjusted under 35 U.S.C. 154(b) by 0 days.

(21) Appl. No.: 18/945,335

(22) Filed: Nov. 12, 2024

(51) Int. Cl.

| | |
|---|---|
| ***C07D 491/22*** | (2006.01) |
| ***B01D 11/02*** | (2006.01) |
| ***B01D 11/04*** | (2006.01) |

(52) U.S. Cl.
CPC ........ *C07D 491/22* (2013.01); *B01D 11/0203* (2013.01); *B01D 11/0211* (2013.01); *B01D 11/0265* (2013.01); *B01D 11/028* (2013.01); *B01D 11/0288* (2013.01); *B01D 11/0296* (2013.01); *B01D 11/0488* (2013.01); *B01D 11/0492* (2013.01)

(58) Field of Classification Search
CPC .............. C07D 491/22; B01D 11/0203; B01D 11/0211; B01D 11/0265
See application file for complete search history.

(56) References Cited

U.S. PATENT DOCUMENTS

| | | | | |
|---|---|---|---|---|
| 5,290,553 | A * | 3/1994 | Iwu | A61K 31/475 546/50 |
| 2018/0271924 | A1 * | 9/2018 | Kariman | A61K 9/0014 |
| 2021/0330731 | A1 * | 10/2021 | Martin | A61K 47/46 |

OTHER PUBLICATIONS

Lewin et al. Akuammine and Dihydroakuammine, Two Indolomonterpene Alkaloids Displaying Affinity For Opioid Receptors. Journal of Natural Products, vol. 55, No. 3, pp. 380-384. (Year: 1992).*

* cited by examiner

*Primary Examiner* — Sikarl A Witherspoon
(74) *Attorney, Agent, or Firm* — Shore IP Group, PLLC; Sean R. Wilsusen

(57) ABSTRACT

Methods are provided for the extraction, isolation, and synthesis of akuammine and other naturally occurring alkaloids from the seeds of the plant *Picralima nitida* (Akuamma), and their conversion to a variety of isomers, analogs, and synthetic derivatives.

15 Claims, 12 Drawing Sheets

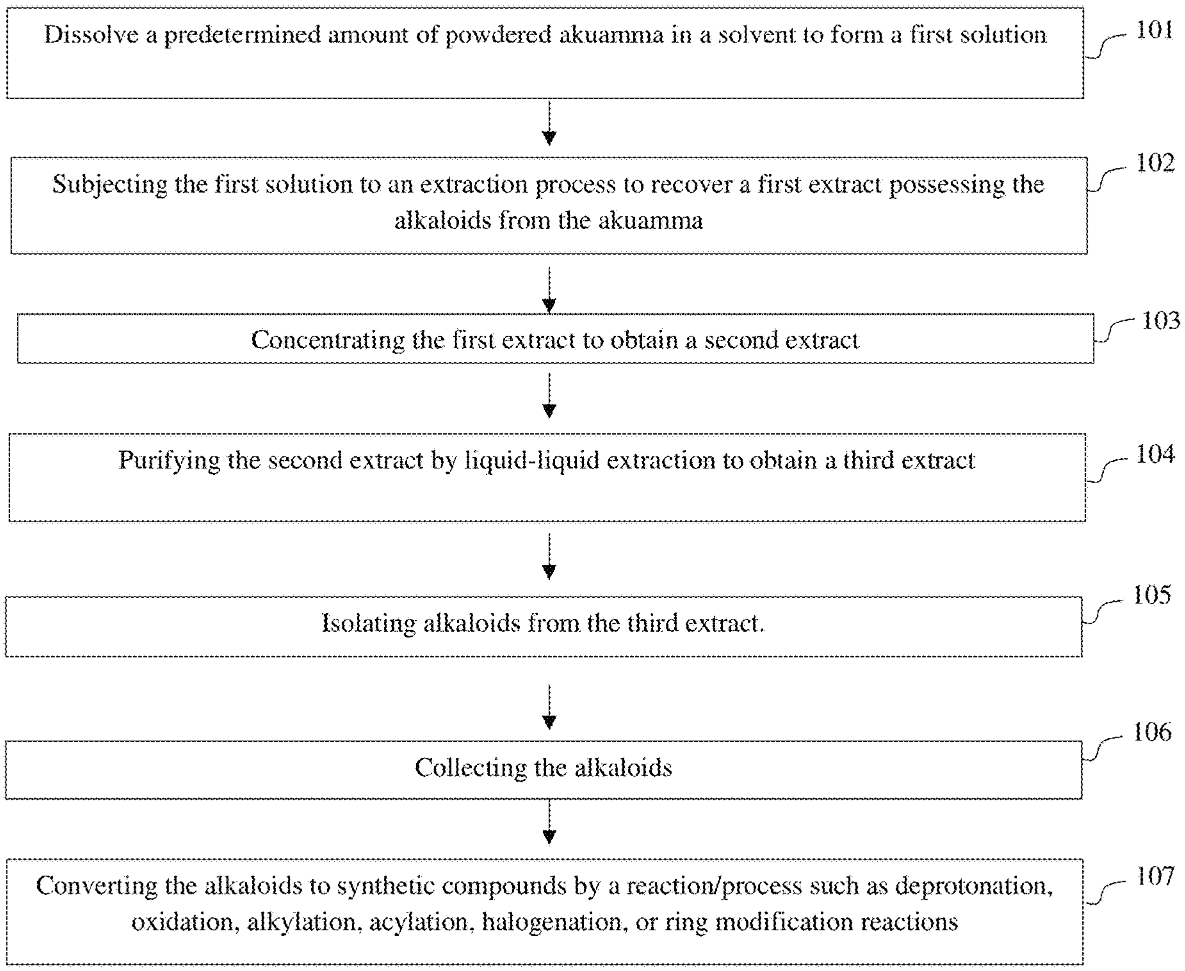

- 101 Dissolve a predetermined amount of powdered akuamma in a solvent to form a first solution
- 102 Subjecting the first solution to an extraction process to recover a first extract possessing the alkaloids from the akuamma
- 103 Concentrating the first extract to obtain a second extract
- 104 Purifying the second extract by liquid-liquid extraction to obtain a third extract
- 105 Isolating alkaloids from the third extract.
- 106 Collecting the alkaloids
- 107 Converting the alkaloids to synthetic compounds by a reaction/process such as deprotonation, oxidation, alkylation, acylation, halogenation, or ring modification reactions

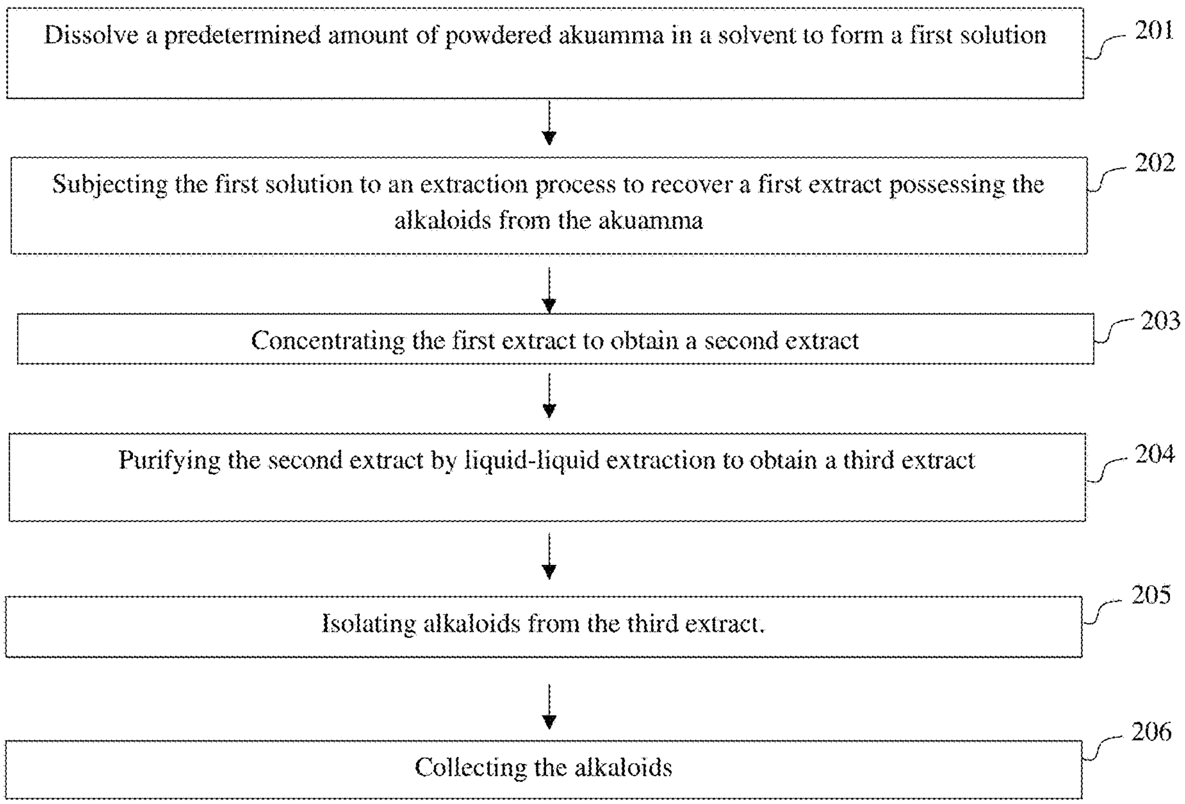

| 201 | Dissolve a predetermined amount of powdered akuamma in a solvent to form a first solution |
| --- | --- |
| 202 | Subjecting the first solution to an extraction process to recover a first extract possessing the alkaloids from the akuamma |
| 203 | Concentrating the first extract to obtain a second extract |
| 204 | Purifying the second extract by liquid-liquid extraction to obtain a third extract |
| 205 | Isolating alkaloids from the third extract. |
| 206 | Collecting the alkaloids |

Figure 9:
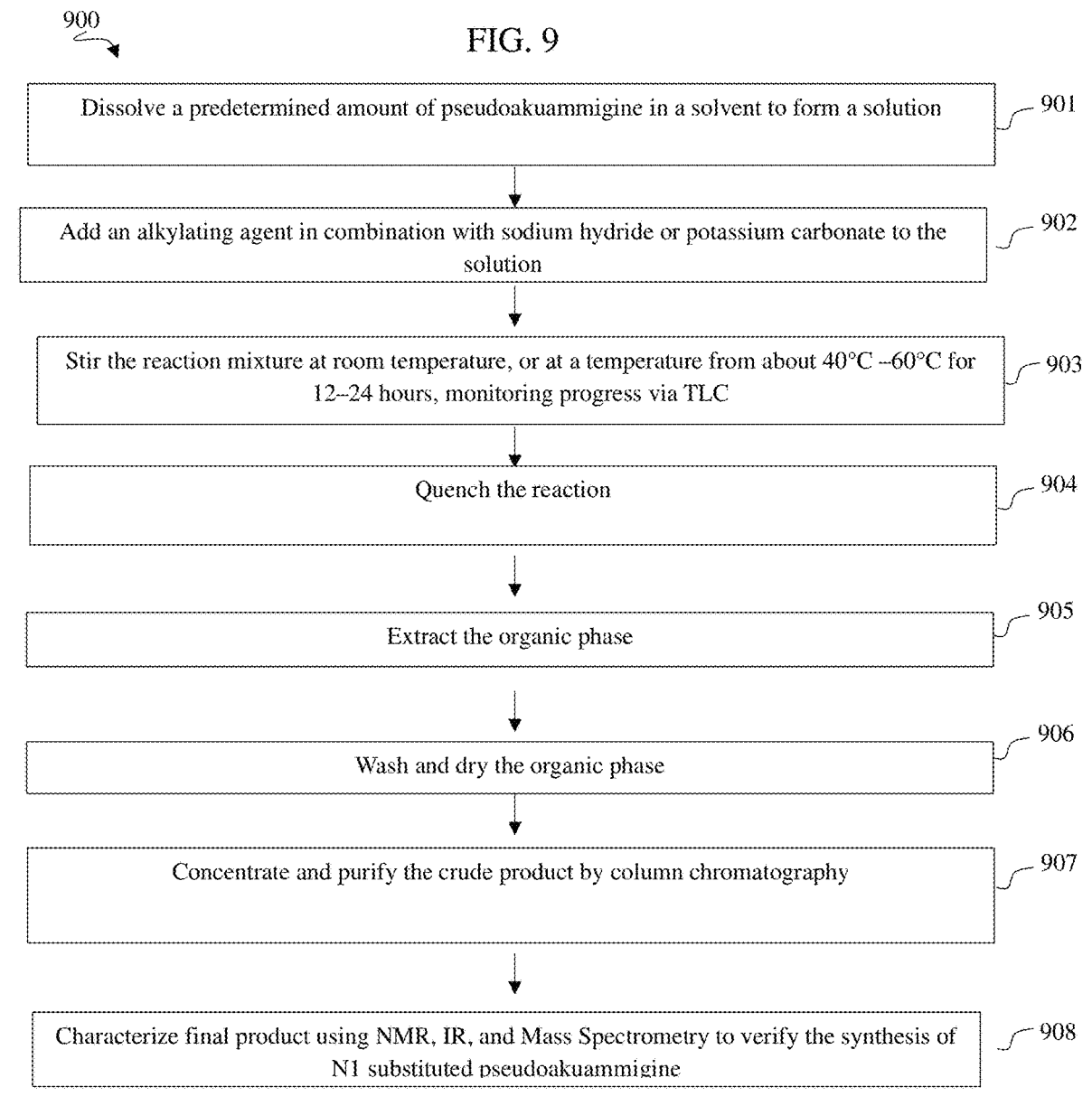

901 Dissolve a predetermined amount of pseudoakuammigine in a solvent to form a solution

↓

902 Add an alkylating agent in combination with sodium hydride or potassium carbonate to the solution

↓

903 Stir the reaction mixture at room temperature, or at a temperature from about 40°C –60°C for 12–24 hours, monitoring progress via TLC

↓

904 Quench the reaction

↓

905 Extract the organic phase

↓

906 Wash and dry the organic phase

↓

907 Concentrate and purify the crude product by column chromatography

↓

908 Characterize final product using NMR, IR, and Mass Spectrometry to verify the synthesis of N1 substituted pseudoakuammigine

1000

1100

1200

METHODS OF PREPARING ISOMERS, ANALOGS, AND SYNTHETIC DERIVATIVES FROM AKUAMMA SEEDS

FIELD

The present disclosure relates to novel processes for the extraction, isolation, and synthesis of akuammine and other naturally occurring alkaloids from the seeds of the plant *Picralima nitida* (Akuamma), and their conversion to a variety of isomers, analogs, and synthetic derivatives. The processes of the present disclosure are capable of creating a broad range of compounds, including structural analogs, N substituted variants, ring modified derivatives, and more, through various chemical modification routes. The processes of the present disclosure may be used to create a variety of synthetic derivatives that have enhanced pharmacological properties.

BACKGROUND

Akuamma seeds, derived from the plant *Picralima nitida*, contain a variety of alkaloids, including akuammine, known for their therapeutic properties. The efficient extraction, isolation, and chemical modification of these alkaloids to produce isomers or synthetic analogs are of significant interest due to their potential applications in medicine.

Improved methods for extracting alkaloids from *Picralima nitida* remain desirable.

SUMMARY

The methods described herein provide an efficient, controlled, and reproducible method for the extraction, isolation, and synthesis of akuammine and other naturally occurring alkaloids from Akuamma seeds. Several high yield extraction methods are described to maximize the recovery of alkaloids. The methods includes processes to chemically modify the alkaloids to produce a wide variety of synthetic compounds, including isomers and analogs, including akuammine analogs, mitraphylline derivatives, isoquinoline derivatives, N substituted variants, and ring modified compounds.

In aspects, a method of the present disclosure for producing a synthetic compound from alkaloids obtained from akuamma includes dissolving a predetermined amount of powdered akuamma in a solvent to form a first solution. The first solution is subjected to an extraction process to recover a first extract possessing the alkaloids from the akuamma. The first extract is concentrated to form a second extract. The second extract is purified using liquid-liquid extraction to obtain a third extract. The alkaloids are isolated from the third extract and collected. The alkaloids are then converted to the synthetic compound by a reaction selected from deprotonation, oxidation, alkylation, acylation, halogenation, or ring modification reactions.

In some aspects, the powdered akuamma is prepared by drying akuamma seeds in an oven at a temperature from about 20° C. to about 60° C., for a period of time from about 12 hours to about 36 hours, and grinding the akuamma seeds to produce the powdered akuamma.

Suitable solvents which may be used in the recited methods include ethanol, methanol, acetonitrile, tetrahydrofuran, dichloromethane, chloroform, acetone, ethyl acetate, hexane, isopropanol, supercritical $CO_2$, or combinations thereof.

In aspects, the first solution is formed under an argon atmosphere.

Suitable extraction processes which may be used in the methods of the present disclosure include Soxhlet Extraction, Ultrasound Assisted Extraction, Microwave Assisted Extraction, or Supercritical Fluid Extraction.

In aspects, the Soxhlet Extraction occurs by placing the powdered akuamma in a Soxhlet extractor, attaching the Soxhlet extractor to a reaction vessel having a solvent therein, heating the reaction vessel at the solvent's boiling point, and collecting the first extract.

In other aspects, the Ultrasound Assisted Extraction occurs by placing the powdered akuamma and a solvent in a reaction vessel, submerging the reaction vessel in an ultrasonic bath and sonicated to form a mixture, and filtering the mixture to obtain the first extract.

In aspects, the Microwave Assisted Extraction occurs by placing the powdered akuamma and a solvent in a microwave-safe reaction vessel, placing the microwave-safe reaction vessel into a microwave reactor at a temperature from 100° C. to 150° C., for 10 minutes to 15 minutes, at a pressure maintained of about 150 psi, and obtaining the first extract.

In some aspects, the Supercritical Fluid Extraction occurs by placing the powdered akuamma and supercritical $CO_2$ and ethanol into the extraction chamber of a supercritical fluid extractor and collecting the first extract in a collection vessel.

In aspects, the liquid-liquid extraction occurs by contacting the second extract with a solvent in a separatory funnel, allowing an organic phase to separate from an aqueous phase, collecting the organic phase, and drying the organic phase to produce the third extract.

In some aspects, the alkaloid is akuammine, pseudoakuammigine, or combinations thereof, and the synthetic compounds are selected from dihydroakuammine, akuammine N-oxide, N methylakuammine, N acetylakuammine, bromoakuammine, akuammidine, akuammicine, pseudoakuammigine, picraline, akuammiline, mitraphylline derivatives, or isoquinoline derivatives.

In aspects, the deprotonation reaction includes combining the alkaloid with a solvent to form a solution; adding sodium hydride or sodium hydroxide to deprotonate a nitrogen; and stirring the solution at room temperature for a period of time from about 30 minutes to about 60 minutes.

In aspects, the oxidation reaction includes combining the alkaloid with a solvent to form a solution; adding an oxidizing agent to the solution; and stirring the solution for a period of time from about 12 hours to about 24 hours at room temperature or an increased temperature from about 30° C. to about 50° C.

In aspects, the alkylation reaction includes combining the alkaloid with a solvent to form a solution; adding a base and an alkylating agent selected from methyl iodide, ethyl iodide, phenethyl bromide, or other alkyl halides to the solution; and stirring the solution for a period of time from about 12 hours to about 24 hours at room temperature or an increased temperature from about 40° C. to about 60° C.

In aspects, the halogenation reaction includes combining the alkaloid with a solvent to form a solution; adding a halogen compound to the solution; and stirring the solution for a period of time from about 12 hours to about 24 hours at room temperature or an increased temperature from about 30° C.-50° C.

In other aspects, the ring modification reaction includes combining the alkaloid with a solvent to form a solution; adding a halogen substituent reagent to the solution; and stirring the solution for a period of time from about 12 hours to about 24 hours at room temperature or an increased temperature from about 30° C.-50° C.

In other aspects, a method of the present disclosure for producing a synthetic compound from alkaloids obtained from akuamma includes drying akuamma seeds in an oven at a temperature from about 20° C. to about 60° C., for a period of time from about 12 hours to about 36 hours, and grinding the akuamma seeds to produce a powdered akuamma. A predetermined amount of the powdered akuamma is dissolved in a solvent selected from ethanol, methanol, acetonitrile, tetrahydrofuran, dichloromethane, chloroform, acetone, ethyl acetate, hexane, isopropanol, supercritical $CO_2$, or combinations thereof to form a first solution. The first solution is subjected to an extraction process selected from extraction process is selected from Soxhlet Extraction, Ultrasound Assisted Extraction, Microwave Assisted Extraction, or Supercritical Fluid Extraction, to recover a first extract possessing the alkaloids from the akuamma. The first extract is concentrated to obtain a second extract. The second extract is purified using liquid-liquid extraction to obtain a third extract. The alkaloids are isolated from the third extract and collected. The collected alkaloids are converted to the synthetic compound by a reaction selected from deprotonation, oxidation, alkylation, acylation, halogenation, or ring modification reactions.

In aspects, the liquid-liquid extraction occurs by contacting the second extract with a solvent in a separatory funnel, allowing an organic phase to separate from an aqueous phase, collecting the organic phase, and drying the organic phase to produce the third extract.

In some aspects the alkaloid is akuammine, pseudoakuammigine, or combinations thereof, and the synthetic compounds are selected from dihydroakuammine, akuammine N-oxide, N methylakuammine, N acetylakuammine, bromoakuammine, akuammidine, akuammicine, pseudoakuammigine, picraline, akuammiline, mitraphylline derivatives, or isoquinoline derivatives.

In other aspects, a method of obtaining alkaloids from akuamma, includes dissolving a predetermined amount of powdered akuamma in a solvent to form a first solution in a first vessel. The first solution is subjected to an extraction process to recover a first extract possessing alkaloids from the akuamma. The first extract is concentrated to form a second extract, and the second extract is then purified using liquid-liquid extraction to obtain a third extract. The alkaloids are isolated from the third extract and collected.

BRIEF DESCRIPTION OF THE DRAWINGS

Various aspects and features of the present disclosure are described hereinbelow with reference to the drawings wherein:

FIG. 1 is a flow chart illustrating a method of producing a synthetic compound from alkaloids obtained from akuamma according to aspects of the present disclosure;

FIG. 2 is a flow chart illustrating a method of obtaining alkaloids from akuamma seeds according to aspects of the present disclosure;

FIG. 9 is a flow chart illustrating a method for producing N1 Substituted pseudoakuammigine from pseudoakuammigine according to aspects of the present disclosure;

DETAILED DESCRIPTION

Figure 3:
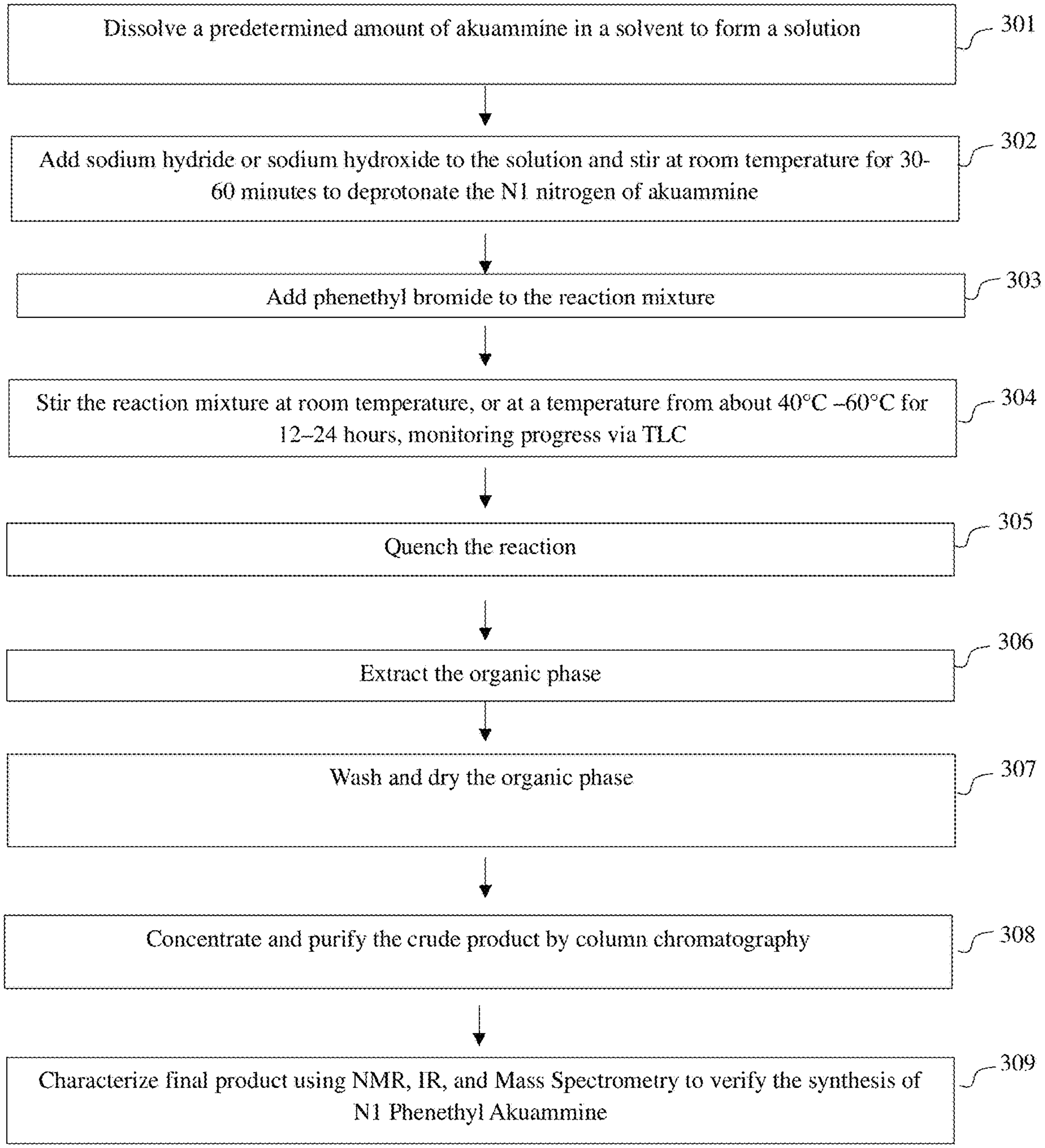
FIG. 3 is a flow chart illustrating a method of producing N1 Phenethyl Akuammine from akuammine according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Akuammine and pseudoakuammigine are indole alkaloids found in akuamma seeds. Both alkaloids are weak agonists of the mu opioid receptor (μOR); however, they produce minimal effects in animal models of antinociception.

Semisynthetic modifications of akuammine and pseudoakuammigine have been explored to enhance opioid receptor activity. Key modifications include the introduction of various functional groups at positions C10, C11, C16, and N1 of the alkaloid structure. Notably, N1 substitutions such as the addition of a phenethyl moiety significantly enhance potency at the mu opioid receptor (μOR). These modifications have yielded derivatives that show up to 70 fold increased potency at the μOR compared to the parent alkaloids, demonstrating their potential in pain management Akuammine has the chemical structure:

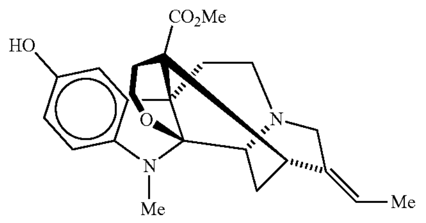

Pseudoakuammigine has the chemical structure:

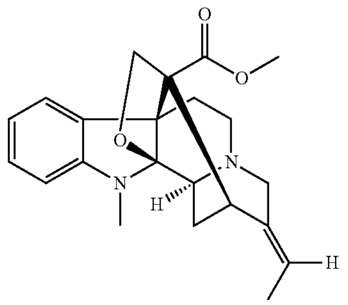 [SMILES: C/C=C1/CN2CC[C@@]34c5ccccc5N(C)[C@]35OCC4(C(=O)OC)[C@@H]1C[C@H]25]

Isolating Alkaloids from Akuamma and Preparing Synthetic Compounds Therefrom.

Referring to FIG. 1, a method 100 for producing a synthetic compound from alkaloids obtained from akuamma includes dissolving a predetermined amount of powdered akuamma in a solvent to form a first solution 101. The first solution is subjected to an extraction process to recover a first extract possessing the alkaloids from the akuamma 102. The first extract is concentrated to obtain a second extract 103. The second extract is purified by liquid-liquid extraction to obtain a third extract 104. Alkaloids are isolated from the third extract 105. The alkaloids are collected 106. The alkaloids are then converted to the synthetic compounds by a reaction/process such as deprotonation, oxidation, alkylation, acylation, halogenation, or ring modification reactions 107.

Exemplary Protocol for Extracting Alkaloids from Akuamma Seeds:

Step 1: Preparation of Seeds

A suitable amount of Akuamma seeds may be utilized in accordance with the methods of the present disclosure. The amount of seeds may be from about 10 grams to about 1000 grams, in aspects from about 50 grams to about 500 grams, in aspects about 100 grams. In some aspects, approximately 100 grams of Akuamma seeds are cleaned to remove foreign materials.

The seeds are placed in a drying oven at a suitable temperature for a suitable period of time. Suitable temperatures may be from about 20° C. to about 60° C., in aspects from about 30° C. to about 50° C., for a period of time from about 12 hours to about 36 hours, in aspects from about 18 hours to about 30 hours. In some aspects, the seeds are placed in a drying over at a temperature of about 40° C. for about 24 hours. The dried seeds are ground into a fine powder using a grinder. About 100 grams of ground seed powder is weighed using an analytical balance.

Step 2: Extraction

To maximize the yield of alkaloids, several high efficiency extraction methods are provided as alternatives. Multiple solvents can be employed, depending on availability and preference. Multiple solvent options are available for flexibility and optimization in the extraction and synthesis steps, including but not limited to ethanol, methanol, acetonitrile, tetrahydrofuran (THF), dichloromethane (DCM), chloroform, acetone, ethyl acetate, hexane, isopropanol, and/or supercritical $CO_2$ (with ethanol as an optional cosolvent).

Various options are used to carry out the extraction of alkaloids from the Akuamma seeds. These options include:

Option 1: Soxhlet Extraction (SE)

About 100 grams of ground Akuamma seed powder is placed into a Soxhlet extractor. About 500 mL of solvent (ethanol, methanol, etc.) is added to a 500 mL round bottom flask.

The Soxhlet apparatus is attached to the mouth of the round bottom flask, which is heated on a heating mantle to maintain reflux at the solvent's boiling point (e.g., 78° C. for ethanol). The extraction is allowed to continue for approximately 6 hours. The extract is collected after the extraction process is complete.

Option 2: Ultrasound Assisted Extraction (UAE)

About 100 grams of ground Akuamma seed powder is placed in a 500 mL round bottom flask. About 500 mL of a suitable solvent (e.g., ethanol, methanol, acetonitrile, or THF) is added thereto. The flask is submerged in an ultrasonic bath and sonicated for 30 minutes at a frequency of 40 kHz.

After extraction, the mixture is filtered using a Buchner funnel and filter paper to remove solid residues. The resulting filtrate is collected for further purification.

Option 3: Microwave Assisted Extraction (MAE)

About 100 grams of ground Akuamma seed powder is placed in a microwave safe 500 mL round bottom flask.

About 500 mL of the chosen solvent (e.g., methanol, ethanol, THF, or acetone) is added to the flask.

The flask is placed into a microwave reactor and heated for 10 minutes to 15 minutes at 100° C. to 150° C., with pressure maintained at 150 psi.

The flask is cooled and the extract is filtered to remove solids.

Option 4: Supercritical Fluid Extraction (SFE)

About 100 grams of ground Akuamma seed powder is placed into the extraction chamber of a supercritical fluid extractor ($CO_2$ system). Supercritical $CO_2$ (adjusted to 300 bar and 40° C.) is used as the primary solvent and ethanol (50 mL) as the cosolvent. Extraction is performed for about 12 hours with the extract received in a collection vessel. The extract is collected from the collection vessel for further processing.

Step 3: Liquid-Liquid Extraction

Equipment:

Separatory funnel (500 mL)

Solvent choices: Dichloromethane, Ethyl acetate, Chloroform (500 mL per extraction cycle)

Distilled water (500 mL)

Anhydrous sodium sulfate (50 g)

Funnel stand and clamps

Procedure:

The extract obtained from Step 2 above (obtained by options 1 (SE), 2 (UAE), 3 (MAE) or 4 (SFE)) is added to a separatory funnel.

About 500 mL of the chosen organic solvent (e.g., dichloromethane, ethyl acetate, or chloroform) is added to the funnel and shaken for 2 minutes, allowing the organic and aqueous phases to separate. The lower organic phase is drained and the extraction process is repeated three times, each time using 500 mL of fresh solvent.

The organic layers are collected and combined in a separate flask.

The combined organic extract is dried by adding 50 grams of anhydrous sodium sulfate to the extract and allowing it to sit for 30 minutes. The solution is filtered to remove sodium sulfate.

Step 4: Concentration

The organic extract is placed into a 500 mL round bottom flask. A rotary evaporator with a water bath set to 40° C. is utilized to remove the solvent with reduced pressure applied using a vacuum pump. The solvent is evaporated until a viscous crude extract is obtained.

Step 5: Isolation of Alkaloids

Ethanol/water gradient system (e.g., 0100% ethanol)

The crude extract from Step 4 above is dissolved in approximately 10 mL of ethanol. A chromatography column (glass column, 2.5 cm in diameter) is packed with 200 grams of silica gel (60120 mesh), and equilibrated with 100% ethanol (other solvents, such as methanol, acetonitrile, or dichloromethane may be used). The dissolved crude extract is loaded onto the column. The column is eluted using an ethanol/water gradient (0-100% ethanol over 500 mL).

Fractions of 10 mL each are collected, with the separation monitored by thin layer chromatography (TLC) using ethyl acetate: hexane as the solvent system. The TLC plates are visualized under a UV lamp to identify alkaloid fractions.

Similar fractions containing akuammine and other alkaloids are pooled together.

Step 6: Purification

The pooled fractions obtained in Step 5 are recrystallized from ethanol. The solution is heated until the alkaloids dissolve. The solution is then slowly cooled to room temperature and then placed in an ice bath to induce crystallization.

For further purification, the recrystallized product is transferred to a High Performance Liquid Chromatography (HPLC) system (C18 column, using a methanol/water gradient of 0-100% methanol for elution).

Fractions are collected based on retention time in the column, and the purity of each fraction is verified using a UV detector.

The purified fractions thus obtained are concentrated using a rotary evaporator.

Referring to FIG. 2, a process 200 for obtaining alkaloids from akuamma seeds includes dissolving a predetermined amount of powdered akuamma in a solvent to form a first solution in a first vessel 201. The first solution is subjected to an extraction process to recover a first extract possessing alkaloids from the akuamma 202. The first extract is concentrated to obtain a second extract 203. The second extract is purified using liquid-liquid extraction to obtain a third extract 204. Alkaloids are then isolated from the third extract 205 and collected 206.

Step 7: Synthesis/Conversion of Isomers, Analogs, and Other Synthetic Compounds

The isolated akuammine and other alkaloids that are obtained following the above processes can undergo various chemical transformations to produce a wide array of synthetic compounds. An overview/summary of examples of possible synthetic compounds that can be produced using different chemical routes includes the following:

Route 1: Deprotonation to Produce Reduced Derivatives

Objective: Reduce functional groups in akuammine to produce derivatives, including dihydroakuammine and tetrahydroakuammine.

Reagents:

Sodium borohydride (NaBH4, 0.5 g per 100 mL solvent)

Ethanol or methanol (100 mL),

Route 2: Oxidation to Produce Oxidized Derivatives

Objective: Oxidize akuammine to produce derivatives such as akuammine N-oxide and oxidized forms of akuammine alkaloids.

Reagents:

Hydrogen peroxide ($H_2O2$, 30%, 25 mL)

Acetonitrile (100 mL)

Route 3: Alkylation to Produce N-Substituted Derivatives

Objective: Alkylate the nitrogen atom in akuammine to produce N-substituted derivatives.

Reagents:

Methyl iodide ($CH_3I$, 12 mL)

Phenethyl bromide ($C_6H_5CH_2CH_2Br$, 12 mL)

Sodium hydroxide (NaOH, 12 g)

Dichloromethane (100 mL)

Compounds Produced:

N Methylakuammine

N Ethylakuammine

N Phenethylakuammine

Route 4: Acylation to Produce N-Acylated Derivatives

Objective: Acylate akuammine to form N acylated derivatives.

Reagents:

Acetyl chloride ($CH_3COCl$, 12 mL)

Acetic anhydride ($(CH_3CO)_2O$, 12 mL)

Pyridine (12 mL)

Dichloromethane (100 mL)

Compounds Produced:

N-Acetylakuammine

N-Benzoylakuammine

Route 5: Halogenation to Produce Halogenated Derivatives

Objective: Halogenate akuammine to produce brominated or iodinated derivatives.

Reagents:

Bromine ($Br_2$, 12 mL)

Iodine ($I_2$, 12 mL)

Dichloromethane (100 mL)

Compounds Produced:

Bromoakuammine

Iodoakuammine

Dibromoakuammine

Route 6: Ring Modified and Structural Derivatives

Objective: Modify the ring structure of akuammine to produce structural variants.

Reagents:

Various alkylating, oxidizing, or reducing agents (as needed)

Compounds Produced:

Akuamidine

Akuammicine

PseudoAkuammigine

Picraline

Akuammiline

Mitraphylline and Isoquinoline Derivatives

Objective: Modify mitraphylline and isoquinoline structures to produce new derivatives.

Reagents:

Suitable alkylating, acylating, or halogenating agents

Compounds Produced:

Mitraphylline Hydrochloride

Substituted Mitraphyllines

1Benzyl1,2,3,4tetrahydroisoquinoline

6Methoxyl,2,3,4tetrahydroisoquinoline

Characterization:

All synthesized compounds will be characterized using:

NMR Spectroscopy to confirm structure.

IR Spectroscopy to identify functional groups.

Mass Spectrometry (MS) to verify molecular weight and structural integrity.

Following the processes of the present disclosure, the following non-exhaustive list of synthetic compounds may be produced.

Akuammine Analogs

Akuamidine: A structural derivative with potential therapeutic properties.

Akuammicine: A derivative with unique pharmacological effects.

PseudoAkuammigine: An alkaloid structurally related to akuammine with different substituents.

Picraline: A potential alkaloid derivative of akuamma.

Akuammiline: A compound that may exhibit distinct pharmacological activity.

Akuammine N-oxide: An oxidized form of akuammine that may show altered biological activity.

Mitraphylline Derivatives

Mitraphylline Hydrochloride: A salt form that could enhance solubility or bioavailability.

Substituted Mitraphyllines: Various mitraphylline analogs with different functional group substitutions.

Isoquinoline Derivatives

Tetrahydroisoquinoline Derivatives: Compounds such as 1-benzyl1,2,3,4tetrahydroisoquinoline, which may exhibit pharmacological potential.

6-Methoxy 1,2,3,4tetrahydroisoquinoline: A functionalized isoquinoline with potential activity.

N-Substituted Variants

N-Methyl Akuammine: A derivative featuring methyl substitution at the nitrogen atom.

N-Phenethyl Akuammine: A phenethyl substituted akuammine with potentially modified pharmacokinetic properties.

Ring Modified Compounds

Dihydro Akuammine: A ring modified derivative with reduced saturation, which may have altered biological activity.

In accordance with the present disclosure, further semisynthetic modifications of akuammine and pseudoakuammigine at positions C10, C11, C16, and N1 can yield a range of opioid active derivatives. These derivatives have increased affinity and selectivity for opioid receptors.

Figure 4:
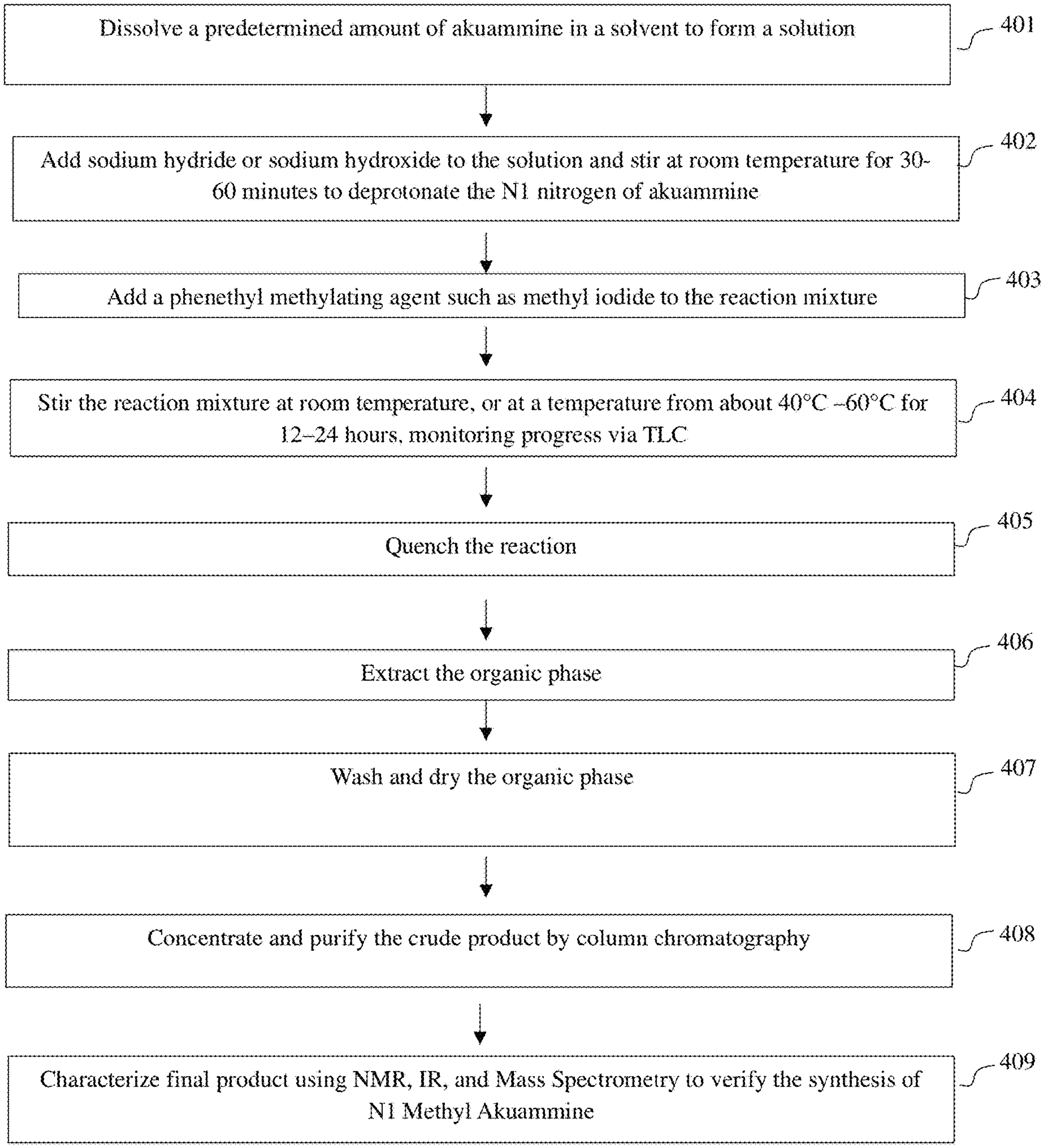
FIG. 4 is a flow chart illustrating a method of for producing N1 Methyl Akuammine from akuammine according to aspects of the present disclosure.

Referring to FIG. 3, a method 300 for producing N1 Phenethyl Akuammine from akuammine includes dissolving akuammine in a suitable solvent to form a solution 301. Sodium hydride or sodium hydroxide is added to the solution and stirred at room temperature for 30-60 minutes to deprotonate the N1 nitrogen of akuammine 302. An alkylating agent, such as phenethyl bromide, is added to the reaction mixture 303. The reaction mixture is stirred at room temperature, or at a temperature from about 40° C. to about 60° C. for about 12 hours to about 24 hours, monitoring progress via TLC 304. The reaction is quenched 305 and the organic phase extracted 306. The organic phase is washed and dried 307. The crude product is concentrated and purified by column chromatography 308. The final product is product is characterized using NMR, IR, and Mass Spectrometry to verify the synthesis of N1 Phenethyl Akuammine 309. Referring to FIG. 4, a method 400 for producing N1 Methyl Akuammine from akuammine includes dissolving akuammine in a suitable solvent to form a solution 401. Sodium hydride or sodium hydroxide is added to the solution and stirred at room temperature for 30-60 minutes to deprotonate the N1 nitrogen of akuammine 402. A methylating agent, such as methyl iodide, is added to the reaction mixture 403. The reaction mixture is stirred at room temperature, or at a temperature from about 40° C. to about 60° C. for about 12 hours to about 24 hours, monitoring progress via TLC 404. The reaction is quenched 405 and the organic phase extracted 406. The organic phase is washed and dried 407. The crude product is concentrated and purified by column chromatography 408. The final product is product is characterized using NMR, IR, and Mass Spectrometry to verify the synthesis of N1 Methyl Akuammine 409.

Figure 5:
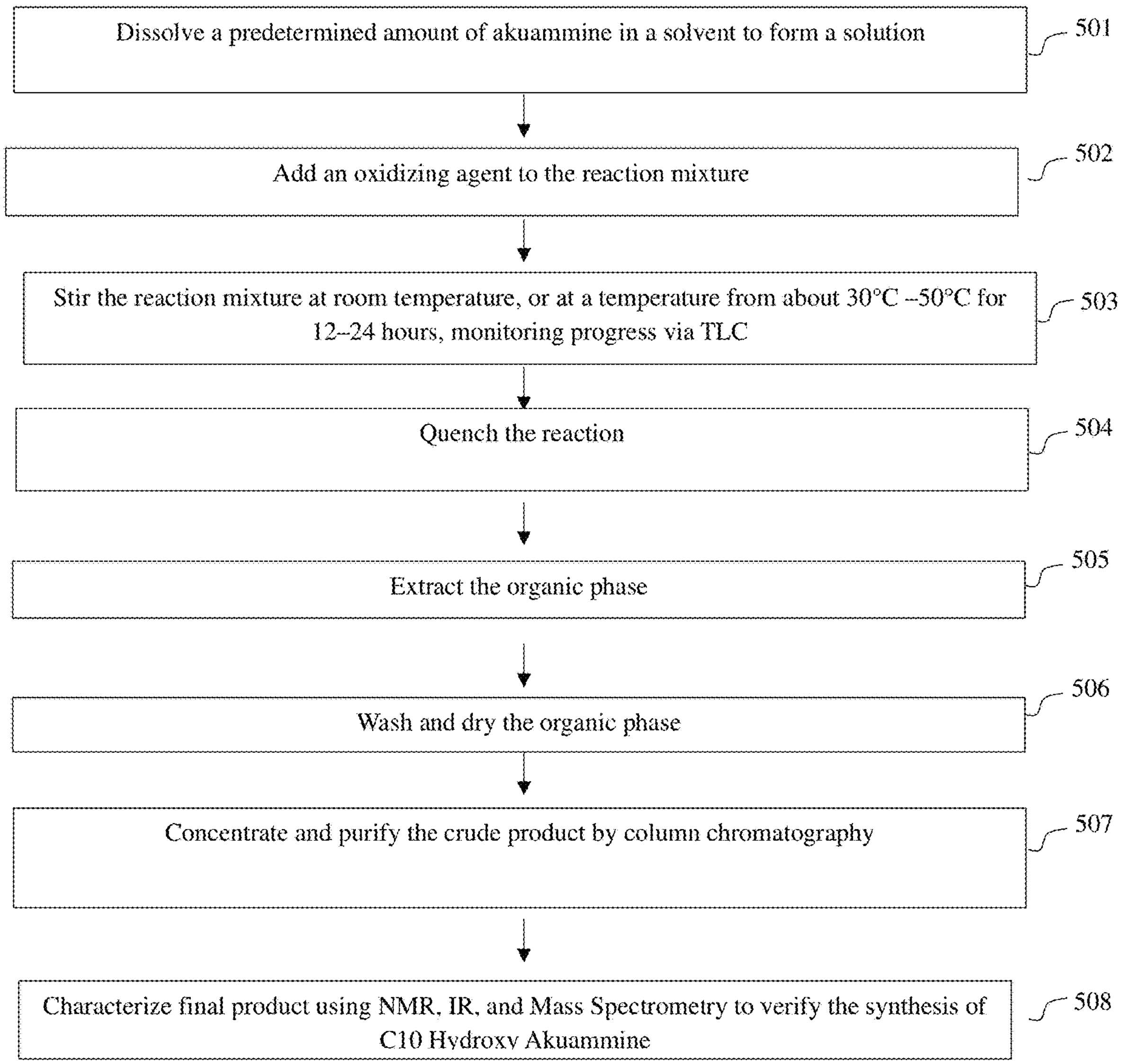
FIG. 5 is a flow chart illustrating a method for producing C10 Hydroxy Akuammine from akuammine according to aspects of the present disclosure.

Referring to FIG. 5, a method 500 for producing C10 Hydroxy Akuammine from akuammine includes dissolving akuammine in a suitable solvent to form a solution 501. An oxidizing agent is added to the reaction mixture 502. The reaction mixture is stirred at room temperature, or at a temperature from about 30° C. to about 50° C. for about 12 hours to about 24 hours, monitoring progress via TLC 503. The reaction is quenched 504 and the organic phase extracted 505. The organic phase is washed and dried 506. The crude product is concentrated and purified by column chromatography 507. The final product is product is characterized using NMR, IR, and Mass Spectrometry to verify the synthesis of C10 Hydroxy Akuammine 508.

Figure 6:
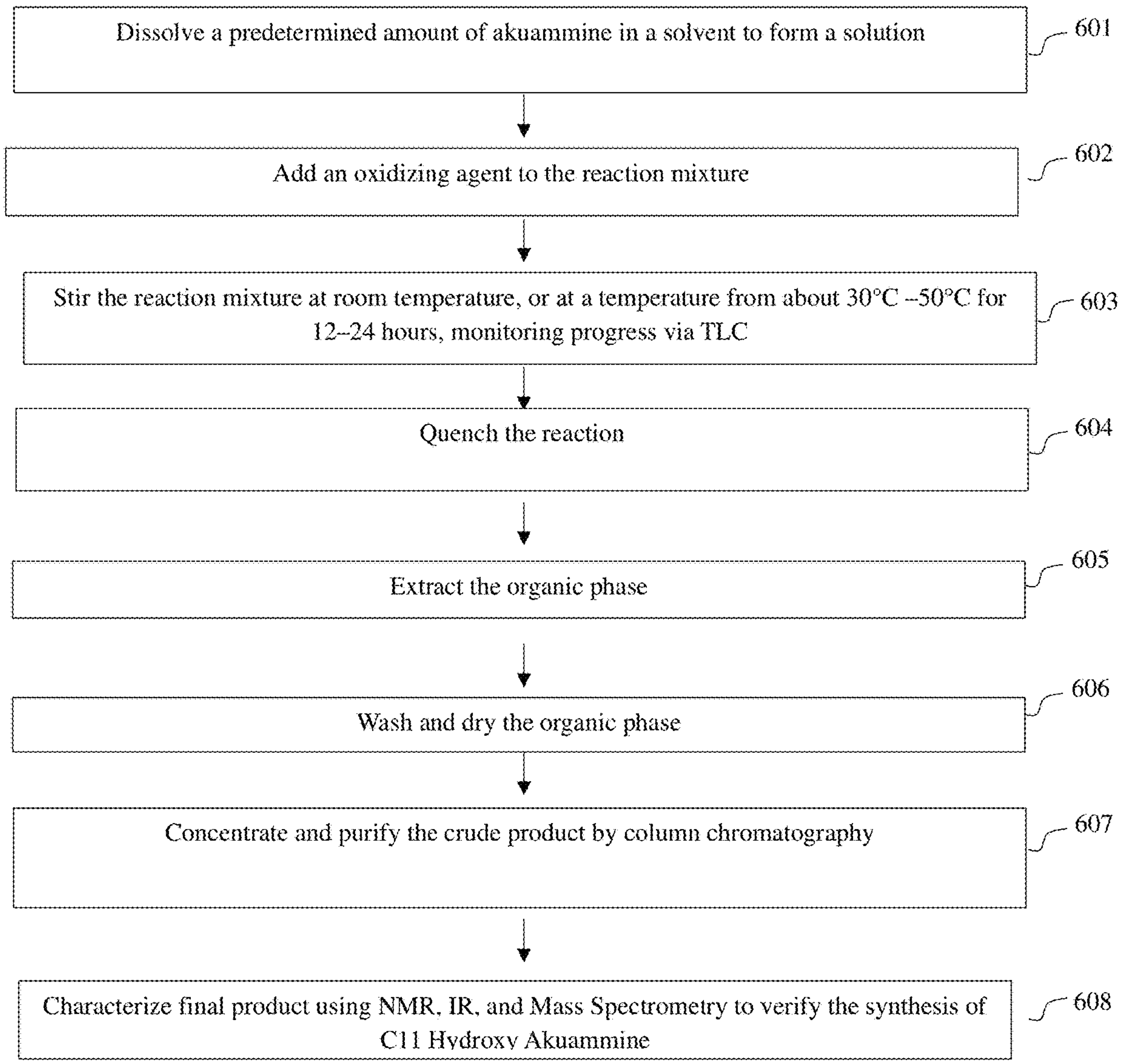
FIG. 6 is a flow chart illustrating a method for producing C11 Hydroxy Akuammine from akuammine according to aspects of the present disclosure.

Referring to FIG. 6, a method 600 for producing C11 Hydroxy Akuammine from akuammine includes dissolving akuammine in a suitable solvent to form a solution 601. An oxidizing agent is added to the reaction mixture 602. The reaction mixture is stirred at room temperature, or at a temperature from about 30° C. to about 50° C. for about 12 hours to about 24 hours, monitoring progress via TLC 603. The reaction is quenched 604 and the organic phase extracted 605. The organic phase is washed and dried 606. The crude product is concentrated and purified by column chromatography 607. The final product is product is characterized using NMR, IR, and Mass Spectrometry to verify the synthesis of C11 Hydroxy Akuammine 608.

Figure 7:
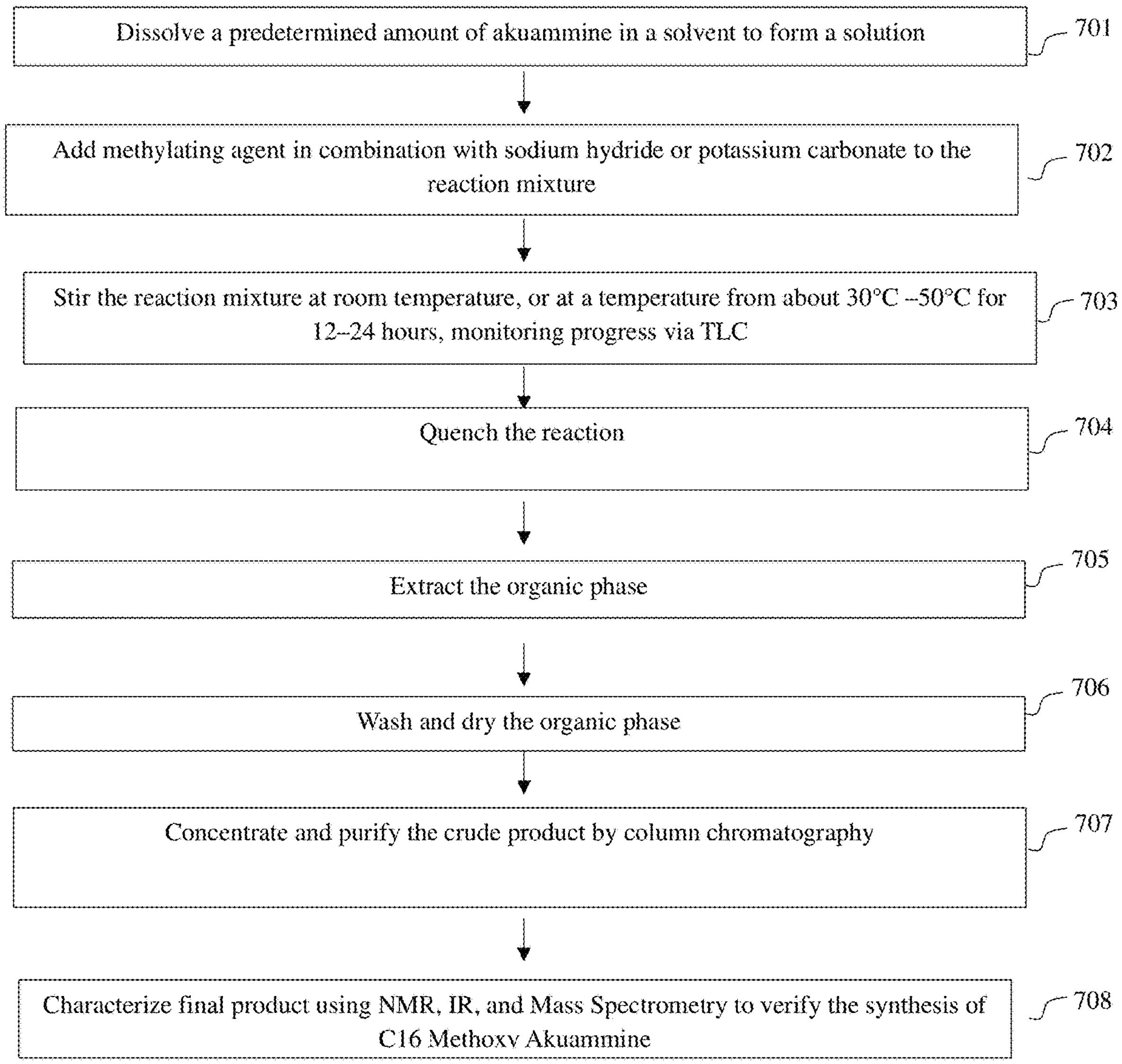
FIG. 7 is a flow chart illustrating a method for producing C16 Methoxy Akuammine from akuammine according to aspects of the present disclosure.

Referring to FIG. 7, a method 700 for producing C16 Methoxy Akuammine from akuammine includes dissolving akuammine in a suitable solvent to form a solution 701. A methylating agent in combination with sodium hydride or potassium carbonate are added to the reaction mixture 702. The reaction mixture is stirred at room temperature, or at a temperature from about 30° C. to about 50° C. for about 12 hours to about 24 hours, monitoring progress via TLC 703. The reaction is quenched 704 and the organic phase extracted 705. The organic phase is washed and dried 706. The crude product is concentrated and purified by column chromatography 707. The final product is product is characterized using NMR, IR, and Mass Spectrometry to verify the synthesis of C16 Methoxy Akuammine 708.

Figure 8:
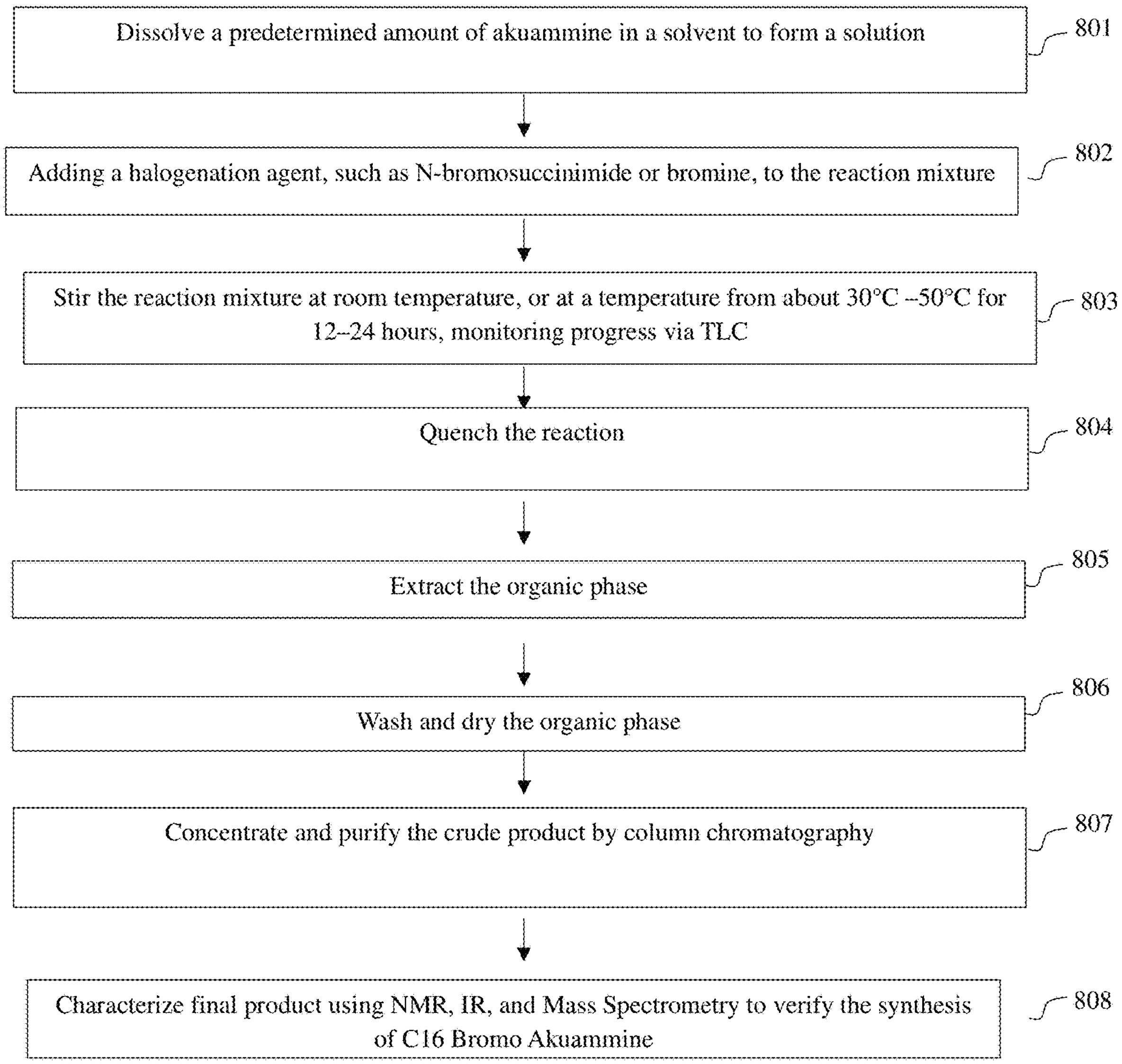
FIG. 8 is a flow chart illustrating a method for producing C16 Bromo Akuammine from akuammine according to aspects of the present disclosure.

Referring to FIG. 8, a method 800 for producing C16 Bromo Akuammine from akuammine includes dissolving akuammine in a suitable solvent to form a solution 801. A halogenation agent, such as N-bromosuccinimide or bromine, is added to the reaction mixture 802. The reaction mixture is stirred at room temperature, or at a temperature from about 30° C. to about 50° C. for about 12 hours to about 24 hours, monitoring progress via TLC 803. The reaction is quenched 804 and the organic phase extracted 805. The organic phase is washed and dried 806. The crude product is concentrated and purified by column chromatography 807. The final product is product is characterized using NMR, IR, and Mass Spectrometry to verify the synthesis of C16 Bromo Akuammine 808.

Figure 10:
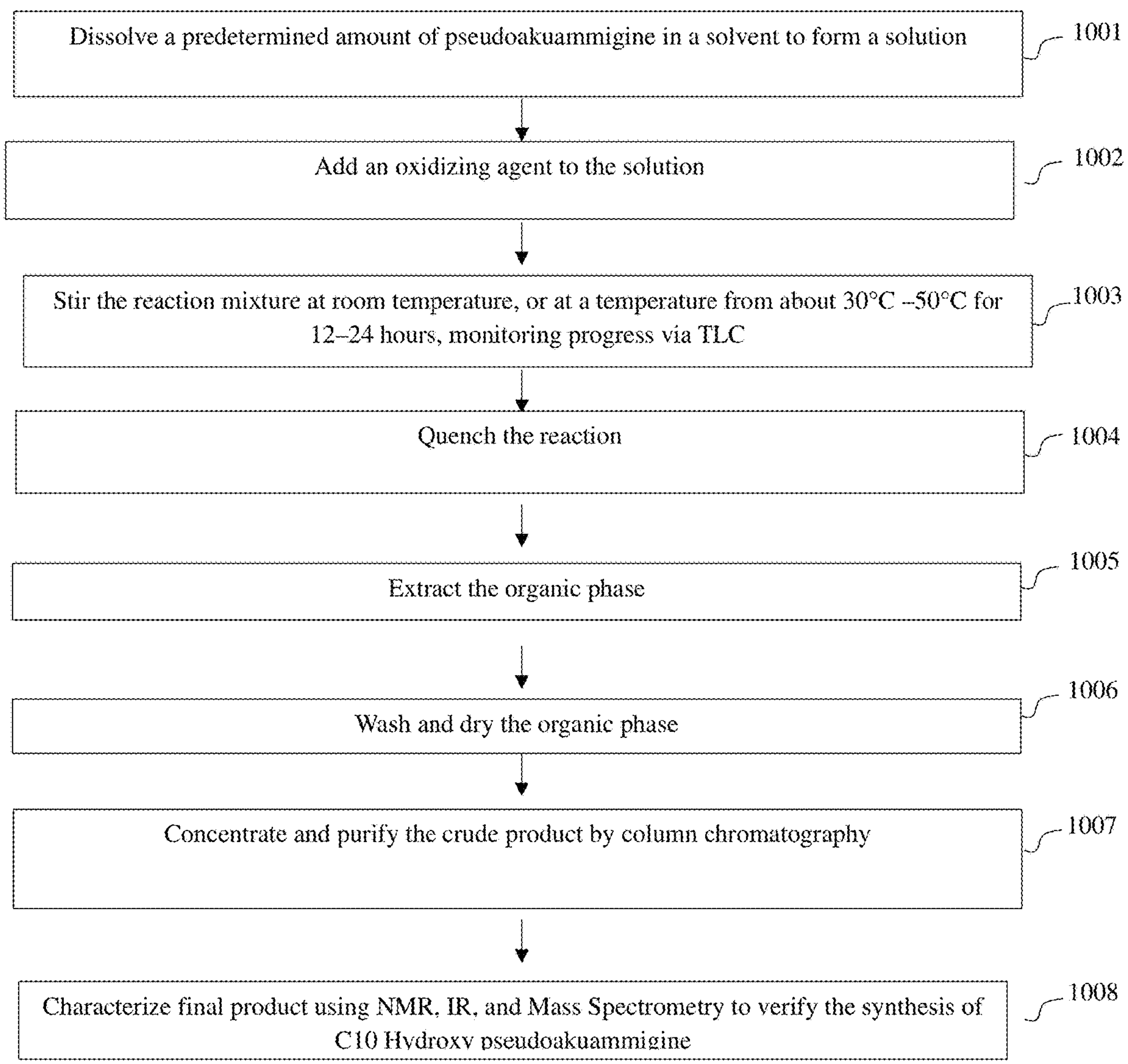
FIG. 10 is a flow chart illustrating a method for producing C10 Hydroxy pseudoakuammigine from pseudoakuammigine according to aspects of the present disclosure.

Referring to FIG. 9, a method 900 for producing N1 Substituted pseudoakuammigine from pseudoakuammigine includes dissolving pseudoakuammigine in a suitable solvent to form a solution 901. An alkylating agent in combination with sodium hydride or potassium carbonate are added to the solution 902. The reaction mixture is stirred at room temperature, or at a temperature from about 40° C. to about 60° C. for about 12 hours to about 24 hours, monitoring progress via TLC 903. The reaction is quenched 904 and the organic phase extracted 905. The organic phase is washed and dried 906. The crude product is concentrated and purified by column chromatography 907. The final product is product is characterized using NMR, IR, and Mass Spectrometry to verify the synthesis of N1 Substituted pseudoakuammigine 908. Referring to FIG. 10, a method 1000 for producing C10 Hydroxy pseudoakuammigine from pseudoakuammigine includes dissolving pseudoakuammigine in a suitable solvent to form a solution 1001. An oxidizing agent is added to the reaction mixture 1002. The reaction mixture is stirred at room temperature, or at a temperature from about 30° C. to about 50° C. for about 12 hours to about 24 hours, monitoring progress via TLC 1003. The reaction is quenched 1004 and the organic phase extracted 1005. The organic phase is washed and dried 1006. The crude product is concentrated and purified by column chromatography 1007. The final product is product is characterized using NMR, IR, and Mass Spectrometry to verify the synthesis of C10 Hydroxy pseudoakuammigine 1008.

Figure 11:
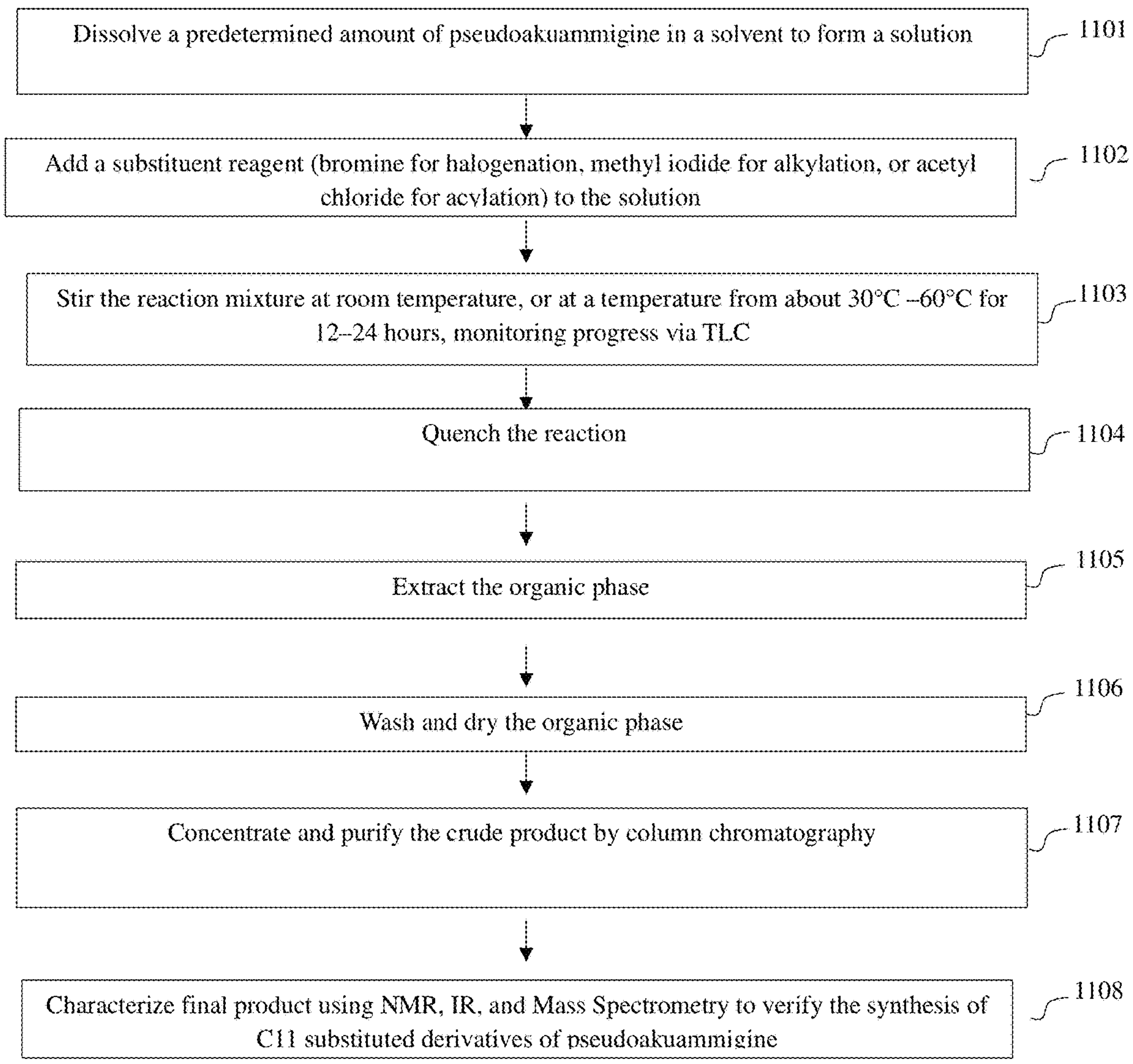
FIG. 11 is a flow chart illustrating a method 1100 for producing C11 substituted derivatives of pseudoakuammigine from pseudoakuammigine according to aspects of the present disclosure.

Referring to FIG. 11, a method 1100 for producing C11 substituted derivatives of pseudoakuammigine from pseudoakuammigine includes dissolving pseudoakuammigine in a suitable solvent to form a solution 1101. A substituent reagent (e.g., bromine for halogenation, methyl iodide for alkylation, or acetyl chloride for acylation) is added to the reaction mixture. (a base, e.g., sodium hydride, potassium carbonate, or pyridine, may be added to the reaction mixture) 1102. The reaction mixture is stirred at room temperature, or at a temperature from about 30° C. to about 60° C. for about 12 hours to about 24 hours, monitoring progress via TLC 1103. The reaction is quenched 1104 and the organic phase extracted 1105. The organic phase is washed and dried 1106. The crude product is concentrated and purified by column chromatography 1107. The final product is product is characterized using NMR, IR, and Mass Spectrometry to verify the synthesis of C11 substituted derivatives of pseudoakuammigine 1108.

Figure 12:
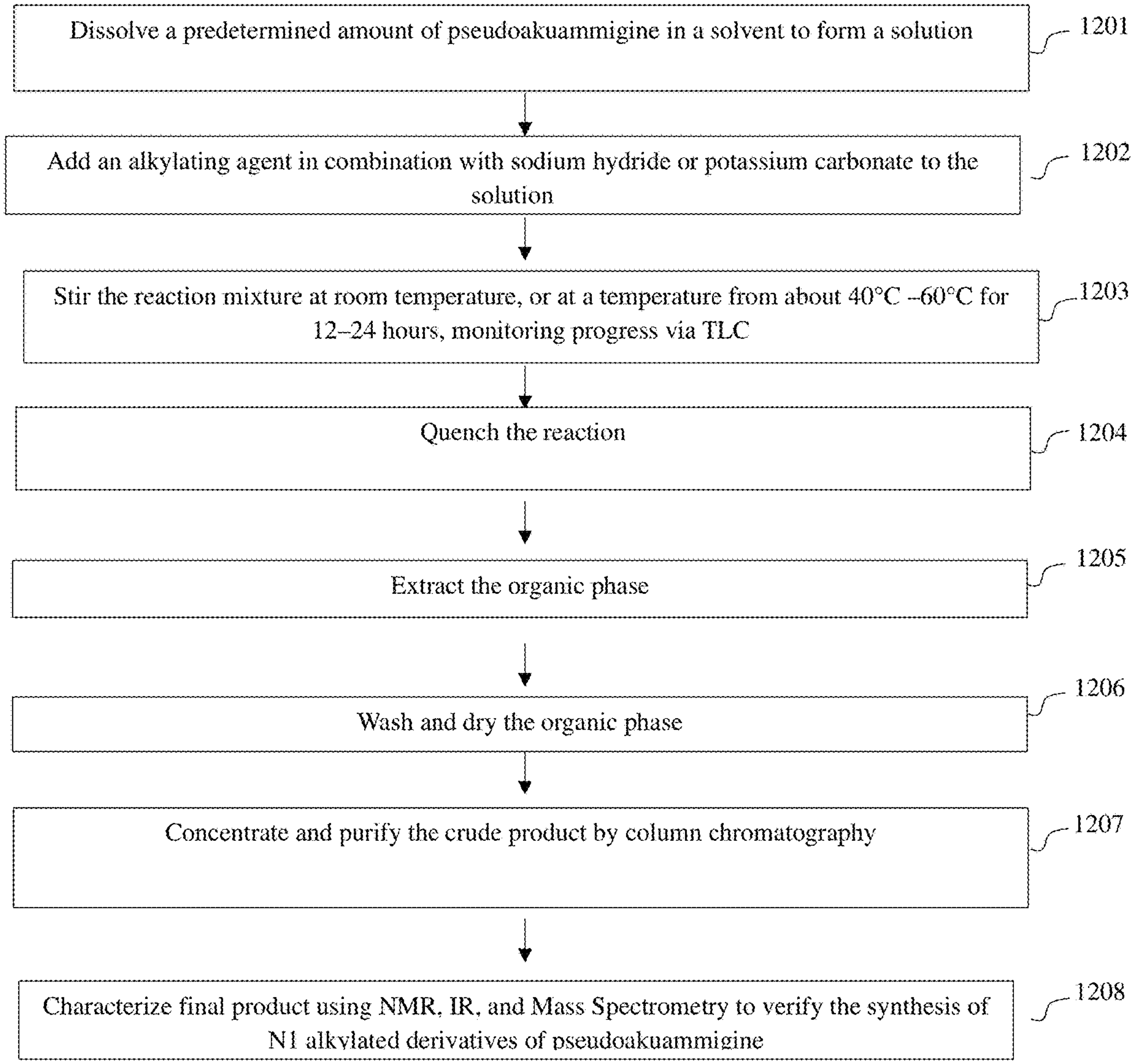
FIG. 12 is a flow chart illustrating a method 1200 for producing N1 alkylated derivatives of pseudoakuammigine from pseudoakuammigine according to aspects of the present disclosure.

Referring to FIG. 12, a method 1200 for producing N1 alkylated derivatives of pseudoakuammigine from pseudoakuammigine includes dissolving pseudoakuammigine in a suitable solvent to form a solution 1201. An alkylating agent (e.g., methyl iodide, ethyl iodide, phenethyl bromide, or other alkyl halide, in combination with sodium hydride or potassium carbonate, are added to the reaction mixture 1202. The reaction mixture is stirred at room temperature, or at a temperature from about 40° C. to about 60° C. for about 12 hours to about 24 hours, monitoring progress via TLC 1203. The reaction is quenched 1204 and the organic phase extracted 1205. The organic phase is washed and dried 1206. The crude product is concentrated and purified by column chromatography 1207. The final product is product is characterized using NMR, IR, and Mass Spectrometry to verify the synthesis of N1 alkylated derivatives of pseudoakuammigine 1208.

What follows are exemplary methods for various chemical transformations of the isolated akuammine and other alkaloids to produce the synthetic compounds.

Exemplary Method for the Production of N1 Phenethyl Akuammine

Deprotonation of N1:

A suitable amount of akuammine, in aspects from about 1 gram to 5 grams, is dissolved in dry tetrahydrofuran (THF) or dichloromethane (DCM) (50 mL to 200 mL) under an inert atmosphere (nitrogen or argon). In aspects, other solvents, such as dimethylformamide (DMF) and/or acetonitrile (MeCN) may be utilized.

Sodium hydride (NaH) (0.5 grams to 1 gram) or sodium hydroxide (NaOH) (0.5 grams to 1 gram) is slowly added to deprotonate the N1 nitrogen of akuammine. The mixture is stirred at room temperature for 30-60 minutes.

Alkylation Reaction:

About 1.2 to about 1.5 equivalents of phenethyl bromide ($C_6H_5CH_2CH_2Br$) (1.5-2 mL per gram of akuammine) is slowly added to the reaction mixture.

The mixture is stirred at room temperature or the temperature can be raised to 40° C. to about 60° C. for about 12 to about 24 hours, monitoring progress via TLC (e.g., silica gel, elution with ethyl acetate/hexane).

Quenching and Workup:

After completion, the reaction is quenched by adding 50-100 mL of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of N1 Phenethyl Akuammine.

The above method is flexible with solvent and reagent choices, ensuring high yield and purity.

Exemplary Method for the Production of N1 Methyl Akuammine

Deprotonation of N1:

A suitable amount of akuammine, in aspects from about 1 gram to 5 grams, is dissolved in dry tetrahydrofuran (THF) or dichloromethane (DCM) (50 mL to 200 mL) under an inert atmosphere (nitrogen or argon). In aspects, other solvents, such as dimethylformamide (DMF) and/or acetonitrile (MeCN) may be utilized.

Sodium hydride (NaH) (0.5 grams to 1 gram) or sodium hydroxide (NaOH) (0.5 grams to 1 gram) is slowly added to deprotonate the N1 nitrogen of akuammine. The mixture is stirred at room temperature for 30-60 minutes.

Methylation Reaction:

About 1.2-1.5 equivalents of methyl iodide ($CH_3I$) (1.2-2 mL per gram of akuammine) is slowly added to the reaction mixture.

The mixture is stirred at room temperature or the temperature can be raised to 40° C. to about 60° C. for about 12 to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of N1 Methyl Akuammine.

The above method provides a streamlined process for methylation, ensuring high yield and purity of N1 Methyl Akuammine.

Exemplary Method for the Production of C10 Hydroxy Akuammine

Oxidation of C10:

A suitable amount of akuammine, in aspects from about 1 gram to 5 grams, is dissolved in dry tetrahydrofuran (THF), dichloromethane (DCM), or acetonitrile (MeCN) (50 mL to 200 mL) under an inert atmosphere (nitrogen or argon).

About 1.2-1.5 equivalents of an oxidizing agent, such as m chloroperoxybenzoic acid (mCPBA) or PCC, is slowly added to the reaction mixture. In some aspects, other oxidizing agents, such as hydrogen peroxide ($H_2O_2$) in combination with a catalyst, or sodium periodate ($NaIO_4$), may be utilized.

The mixture is stirred at room temperature or the temperature can be raised to 30° C. to about 50° C. for about 12 hours to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization

The final product is characterized using NMR, IR, and Mass Spectrometry to verify the synthesis of C10 Hydroxy Akuammine.

The above method efficiently produces C10 Hydroxy Akuammine with high yield and purity through selective oxidation at the C10 position.

Efficient Method to Produce C11 Hydroxy Akuammine

Selective Oxidation of C11:

A suitable amount of akuammine, in aspects from about 1 gram to 5 grams, is dissolved in dry tetrahydrofuran (THF), dichloromethane (DCM), or acetonitrile (MeCN) (50 mL to 200 mL) under an inert atmosphere (nitrogen or argon).

About 1.2-1.5 equivalents of an oxidizing agent, such as m chloroperoxybenzoic acid (mCPBA), PCC, or sodium periodate ($NaIO_4$), is slowly added to the reaction mixture.

The mixture is stirred at room temperature or the temperature can be raised to 30° C. to about 50° C. for about 12 hours to about 24 hours, monitoring progress via TLC (e.g., silica gel, elution with ethyl acetate/hexane).

Quenching and Workup:

After completion, the reaction is quenched by adding 50-100 mL of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of C11 Hydroxy Akuammine.

The above method uses selective oxidation for high yield production of C11Hydroxy Akuammine.

Exemplary Method for the Production of C16 Methoxy Akuammine

Methoxylation at C16:

A suitable amount of akuammine, in aspects from about 1 gram to 5 grams, is dissolved in dry tetrahydrofuran (THF) or dichloromethane (DCM) (50 mL to 200 mL) under an inert atmosphere (nitrogen or argon).

About 1.2-1.5 equivalents of a methylating agent, such as dimethyl sulfate (DMS) or methyl iodide ($CH_3I$), is slowly added to the reaction mixture.

About 1.2-1.5 equivalents of sodium hydride (NaH, 0.5 grams to 1 gram) or potassium carbonate ($K_2CO_3$, 0.5 grams to 1 gram) is added as a base to facilitate methoxylation.

The mixture is stirred at room temperature or the temperature can be raised to 30° C. to about 50° C. for about 12 hours to about 24 hours, monitoring progress via TLC (e.g., silica gel, elution with ethyl acetate/hexane).

Quenching and Workup:

After completion, the reaction is quenched by adding 50-100 mL of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of C16 Methoxy Akuammine.

The above method provides efficient C16 methoxylation, ensuring high yield and purity in the production of C16 Methoxy Akuammine.

Exemplary Method for the Production of C16 Bromo Akuammine

A suitable amount of akuammine, in aspects from about 1 gram to 5 grams, is dissolved in dry tetrahydrofuran (THF), dichloromethane (DCM), or acetonitrile (MeCN) (50 mL to 200 mL) under an inert atmosphere (nitrogen or argon).

About 1.2-1.5 equivalents of N-bromosuccinimide (NBS) or bromine ($Br_2$) is slowly added to the reaction mixture. Optionally, a small amount of AIBN (azobisisobutyronitrile) is added as a free radical initiator, or the reaction mixture is exposed to light for free radical initiation) to promote bromination.

The mixture is stirred at room temperature or the temperature can be raised to 30° C. to about 50° C. for about 12 hours to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of C16 Bromo Akuammine.

The above method efficiently introduces a bromine atom at the C16 position, yielding C16 bromo akuammine with high purity.

Exemplary Method for the Production of N1 Substituted PseudoAkuammigine

N1 Substitution Reaction:

A suitable amount of pseudoakuammigine, in aspects from about 1 gram to 5 grams, is dissolved in dry tetrahydrofuran (THF) or dichloromethane (DCM) (50 mL to 200 mL) under an inert atmosphere (nitrogen or argon).

About 1.2-1.5 equivalents of an alkylating agent (e.g., methyl iodide ($CH_3I$), phenethyl bromide, or other alkyl halides) is added to the reaction mixture. Sodium hydride (NaH, 0.5 grams to 1 gram) or potassium carbonate ($K_2CO_3$, 0.5 grams to 1 gram) is added as a base.

The mixture is stirred at room temperature or the temperature can be raised to 40° C. to about 60° C. for about 12 hours to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of N1 Substituted pseudoakuammigine.

The above method allows for efficient substitution at the N1 position of pseudoakuammigine, yielding high purity substituted derivatives.

Exemplary Method for the Production of C10 Hydroxy PseudoAkuammigine

Selective Oxidation at C10:

A suitable amount of pseudoakuammigine, in aspects from about 1 gram to 5 grams, is dissolved in dry tetrahydrofuran (THF), dichloromethane (DCM), or acetonitrile (MeCN) (50 mL to 200 mL) under an inert atmosphere (nitrogen or argon).

About 1.2-1.5 equivalents of an oxidizing agent (e.g., m chloroperoxybenzoic acid (mCPBA), PCC, or sodium periodate ($NaIO_4$)) is added to the reaction mixture.

The mixture is stirred at room temperature or the temperature can be raised to 30° C. to about 50° C. for about 12 to about 24 hours, monitoring progress via TLC (e.g., silica gel, elution with ethyl acetate/hexane).

Quenching and Workup:

After completion, the reaction is quenched by adding 50-100 mL of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the synthesis of C10 Hydroxy pseudoakuammigine.

The above method employs selective oxidation to efficiently produce C10 Hydroxy pseudoakuammigine.

Exemplary Method for the Production of C11 Substituted Derivatives of PseudoAkuammigine Substitution Reaction at C11:

A suitable amount of pseudoakuammigine, in aspects from about 1 gram to 5 grams, is dissolved in dry tetrahydrofuran (THF), dichloromethane (DCM), or acetonitrile (MeCN) (50 mL to 200 mL) under an inert atmosphere (nitrogen or argon).

About 1.2-1.5 equivalents of a substituent reagent (e.g., bromine ($Br_2$) for halogenation, methyl iodide ($CH_3I$)) for alkylation, or acetyl chloride ($CH_3COCl$) for acylation) is added to the reaction mixture. If necessary, 1.2-1.5 equivalents of a base (e.g., sodium hydride (NaH), potassium carbonate ($K_2CO_3$), or pyridine) may be added to the reaction mixture.

The mixture is stirred at room temperature or the temperature can be raised to 30° C. to about 60° C. for about 12 to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the formation of C11 substituted derivatives of pseudoakuammigine.

The above method enables efficient substitution at the C11 position, allowing for the production of various C11 substituted pseudoakuammigine derivatives, including halogenated, alkylated, and acylated products.

Exemplary Method for the Production of N1 Alkylated Derivatives of PseudoAkuammigine Alkylation Reaction at N1:

A suitable amount of pseudoakuammigine, in aspects from about 1 gram to 5 grams, is dissolved in dry tetrahydrofuran (THF), dichloromethane (DCM), or dimethylformamide (DMF) (50 mL to 200 mL) under an inert atmosphere (nitrogen or argon).

About 1.2-1.5 equivalents of an alkylating agent (e.g., methyl iodide ($CH_3I$), ethyl iodide ($C2H_5I$), phenethyl bromide, or other alkyl halides) is added to the reaction mixture. Sodium hydride (NaH, 0.5 grams to 1 gram) or potassium carbonate ($K_2CO_3$, 0.5 grams to 1 gram) is added as the base.

The mixture is stirred at room temperature or the temperature can be raised to 40° C. to about 60° C. for about 12 to about 24 hours, monitoring progress via TLC (e.g., silica gel, elution with ethyl acetate/hexane).

Quenching and Workup:

After completion, the reaction is quenched by adding 50-100 ml of water. The organic phase is then extracted using dichloromethane (3×50 mL). The organic phase is then washed with brine (50 mL) and dried over 10 grams of anhydrous sodium sulfate.

Purification:

The resulting solution is concentrated using a rotary evaporator. The crude product is purified by column chromatography using silica gel, with an elution gradient of ethyl acetate/hexane (0-20%).

Characterization:

The final product is characterized using NMR, IR, and Mass Spectrometry to verify the formation of N1 alkylated derivatives of pseudoakuammigine.

The above method enables efficient production N1 alkylated derivatives of pseudoakuammigine, allowing for the introduction of various alkyl groups, such as methyl, ethyl, and phenethyl, at the N1 position.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A method for producing a synthetic compound from alkaloids obtained from akuamma, comprising:

dissolving a predetermined amount of powdered akuamma in a solvent under an argon atmosphere to form a first solution;

subjecting the first solution to an extraction process to recover a first extract possessing the alkaloids from the akuamma;

concentrating the first extract to obtain a second extract;

purifying the second extract using liquid-liquid extraction to obtain a third extract;

isolating the alkaloids from the third extract;

collecting the alkaloids; and converting the alkaloids to the synthetic compound by a reaction selected from deprotonation, oxidation, alkylation, acylation, halogenation, or ring modification reactions.

2. The method of claim 1, wherein the powdered akuamma is prepared by drying akuamma seeds in an oven at a temperature from about 20° C. to about 60° C., for a period of time from about 12 hours to about 36 hours, and grinding the akuamma seeds to produce the powdered akuamma.

3. The method of claim 1, wherein the solvent includes ethanol, methanol, acetonitrile, tetrahydrofuran, dichloromethane, chloroform, acetone, ethyl acetate, hexane, isopropanol, supercritical $CO_2$, or combinations thereof.

4. The method of claim 1, wherein the extraction process is selected from Soxhlet Extraction, Ultrasound Assisted Extraction, Microwave Assisted Extraction, or Supercritical Fluid Extraction.

5. The method of claim 4, wherein the Soxhlet Extraction occurs by placing the powdered akuamma in a Soxhlet extractor, attaching the Soxhlet extractor to a reaction vessel having a solvent therein, heating the reaction vessel at the solvent's boiling point, and collecting the first extract.

6. The method of claim 4, wherein the Ultrasound Assisted Extraction occurs by placing the powdered akuamma and a solvent in a reaction vessel, submerging the reaction vessel in an ultrasonic bath and sonicated to form a mixture, and filtering the mixture to obtain the first extract.

7. The method of claim 4, wherein the Microwave Assisted Extraction occurs by placing the powdered akuamma and a solvent in a microwave-safe reaction vessel, placing the microwave-safe reaction vessel into a microwave reactor at a temperature from 100° C. to 150° C., for 10 minutes to 15 minutes, at a pressure maintained of about 150 psi, and obtaining the first extract.

8. The method of claim 4, wherein the Supercritical Fluid Extraction occurs by placing the powdered akuamma and supercritical $CO_2$ and ethanol into the extraction chamber of a supercritical fluid extractor and collecting the first extract in a collection vessel.

9. The method of claim 1, wherein the liquid-liquid extraction occurs by contacting the second extract with a solvent in a separatory funnel, allowing an organic phase to separate from an aqueous phase, collecting the organic phase, and drying the organic phase to produce the third extract.

10. The method of claim 1, wherein the alkaloid is akuammine, pseudoakuammigine, or combinations thereof, and the synthetic compounds are selected from dihydroakuammine, akuammine N-oxide, N methylakuammine, N acetylakuammine, bromoakuammine, akuammidine, akuammicine, pseudoakuammigine, picraline, akuammiline, mitraphylline derivatives, or isoquinoline derivatives.

11. The method of claim 1, wherein the deprotonation reaction comprises:

combining the alkaloid with a solvent to form a solution;

adding sodium hydride or sodium hydroxide to deprotonate a nitrogen; and stirring the solution at room temperature for a period of time from about 30 minutes to about 60 minutes.

12. The method of claim 1, wherein the oxidation reaction comprises:

combining the alkaloid with a solvent to form a solution;

adding an oxidizing agent to the solution; and stirring the solution for a period of time from about 12 hours to about 24 hours at room temperature or an increased temperature from about 30° C. to about 50° C.

13. The method of claim 1, wherein the alkylation reaction comprises:

combining the alkaloid with a solvent to form a solution;

adding a base and an alkylating agent selected from methyl iodide, ethyl iodide, phenethyl bromide, or other alkyl halides to the solution; and stirring the solution for a period of time from about 12 hours to about 24 hours at room temperature or an increased temperature from about 40° C. to about 60° C.

14. The method of claim 1, wherein the halogenation reaction comprises:

combining the alkaloid with a solvent to form a solution;

adding a halogen compound to the solution; and stirring the solution for a period of time from about 12 hours to about 24 hours at room temperature or an increased temperature from about 30° C.-50° C.

15. The method of claim 1, wherein the ring modification reaction comprises:

combining the alkaloid with a solvent to form a solution;

adding a halogen substituent reagent to the solution; and stirring the solution for a period of time from about 12 hours to about 24 hours at room temperature or an increased temperature from about 30° C.-50° C.

* * * * *